United States Patent [19]

Neff

[11] Patent Number: 4,828,237
[45] Date of Patent: May 9, 1989

[54] REDUCED LENGTH MACPHERSON STRUT

[75] Inventor: Charles E. Neff, Ferndale, Mich.

[73] Assignee: TRW Inc., Lyndhurst, Ohio

[21] Appl. No.: 162,634

[22] Filed: Mar. 1, 1988

[51] Int. Cl.⁴ .................. B60G 13/00; F16F 7/00; F16F 9/00
[52] U.S. Cl. .................. 267/221; 188/321.11; 188/322.17; 188/322.12; 188/322.19; 267/34; 267/166.1; 280/668; 280/701
[58] Field of Search .............. 280/668, 701, 710, 666, 280/670, 698, 724; 267/33–35, 286–294, 64.11, 64.15–64.28, 166.1, 166, 170, 217–226, 196, 202, 203, 212, 216, 122; 188/321.11, 322.19, 322.11, 322.12, 322.16, 322.17, 317–319, 298

[56] References Cited

U.S. PATENT DOCUMENTS

| | | | |
|---|---|---|---|
| 2,121,339 | 6/1938 | Conkling | 188/322.16 X |
| 2,861,795 | 11/1958 | Blake | 267/225 |
| 3,000,625 | 9/1961 | Polhemus | 267/64.24 |
| 3,149,830 | 9/1964 | Broadwell | 267/64.24 |
| 3,163,411 | 12/1964 | Heckethorn | 267/225 |
| 3,211,444 | 10/1965 | Avner | 280/668 X |
| 3,297,312 | 1/1967 | Hines | 267/34 |
| 3,385,589 | 5/1968 | Erdmann | 267/34 |
| 3,572,678 | 3/1971 | Jerz, Jr. | 267/225 |
| 3,603,574 | 9/1971 | Dieter | 267/34 |
| 3,917,244 | 11/1975 | Peddinghaus | 267/221 X |
| 4,033,542 | 7/1977 | Moehle et al. | 267/34 X |
| 4,120,489 | 10/1978 | Borlinghaus | 267/166.1 |
| 4,159,105 | 6/1979 | Laan et al. | 280/724 X |
| 4,219,190 | 8/1980 | Nagara | 267/64.28 |
| 4,256,292 | 3/1981 | Sullivan, Jr. et al. | 267/221 X |
| 4,318,535 | 3/1982 | Imai | 267/34 X |
| 4,505,458 | 3/1985 | Schultz | 267/209 |
| 4,635,766 | 1/1987 | Street, Jr. | 188/284 X |
| 4,736,931 | 4/1988 | Christopherson | 267/64.26 X |

FOREIGN PATENT DOCUMENTS

| | | | |
|---|---|---|---|
| 214917 | 11/1956 | Australia | 188/322.12 |
| 198734 | 10/1986 | European Pat. Off. | 188/322.19 |
| 1209445 | 7/1956 | Fed. Rep. of Germany | 267/64.26 |
| 1041742 | 10/1958 | Fed. Rep. of Germany | 188/322.12 |
| 2256201 | 11/1972 | Fed. Rep. of Germany | 267/34 |
| 2314215 | 3/1973 | Fed. Rep. of Germany | 267/64.26 |
| 83633 | 7/1981 | Japan | 267/36 |
| 868723 | 5/1961 | United Kingdom | 267/34 |
| 972765 | 10/1964 | United Kingdom | 267/64.26 |

Primary Examiner—Douglas C. Butler
Attorney, Agent, or Firm—Tarolli, Sundheim & Covell

[57] ABSTRACT

A reduced length hydraulic shock absorber, preferably for use in a MacPherson strut, does not sacrifice structural rigidity under radial loads. A circumferential sleeve member is attached to the cylinder adjacent the end of the cylinder from which the piston rod extends. The piston rod extends through an opening in the sleeve end with a bearing therein. The sleeve telescopes axially on the cylinder. The sleeve is spring-biased axially outwardly of the cylinder, and is telescoped outwardly from the cylinder at all times except when the shock absorber is fully or mostly compressed. The sleeve, when telescoped outwardly, thus provides radial load bearing support for the piston rod at a point spaced apart from the cylinder end. This allows the shock absorber to be designed without any piston rod/cylinder overlap, and the piston rod may consequently be made shorter. The cylinder end bearing and the piston/cylinder wall bearing may also be reduced in thickness, since less radial force is transmitted by these bearings because the piston rod is shorter and provides a shorter moment arm and because the sleeve end bearing transmits some of the radial force which would otherwise be transmitted solely by these two bearings. Together, these length reductions allow a desired reduction in the maximum overall length of the shock absorber.

13 Claims, 2 Drawing Sheets

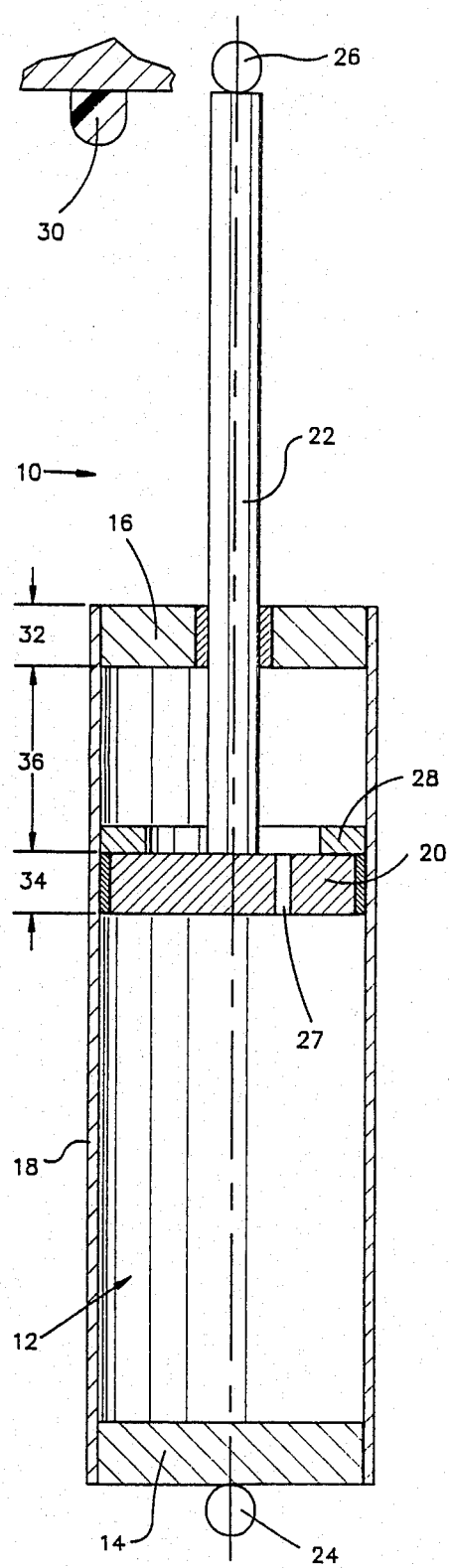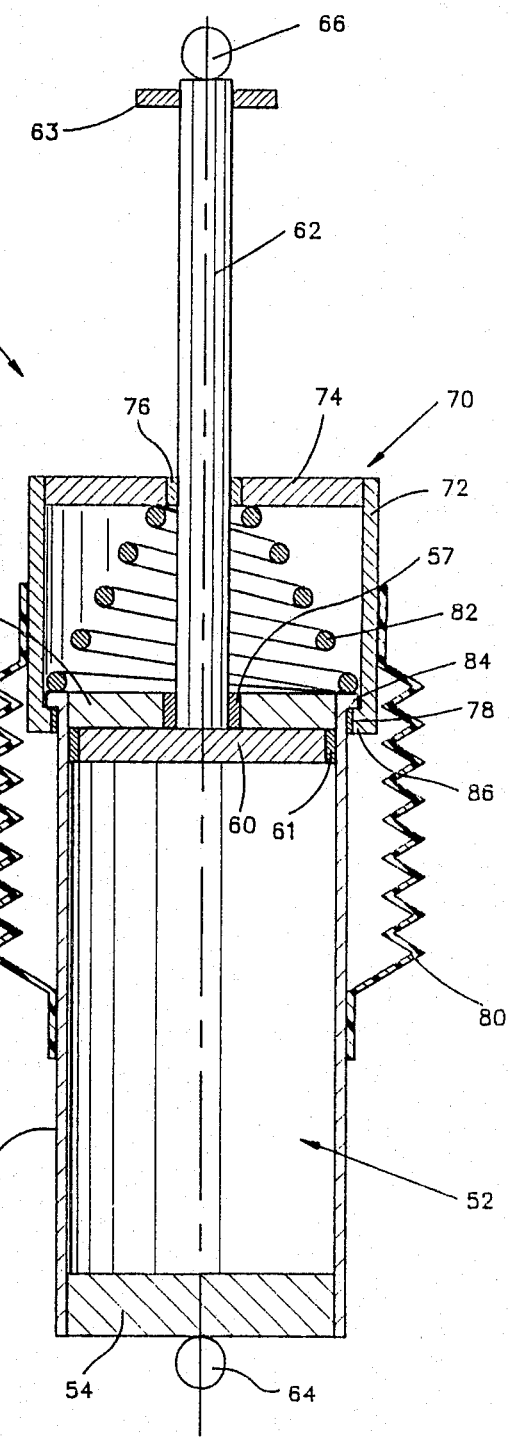
FIG. 1
(PRIOR ART)
FIG. 2

REDUCED LENGTH MACPHERSON STRUT

BACKGROUND OF THE INVENTION

1. Field of the Invention

The present invention relates to an apparatus for damping relative movement of two parts. In particular, the present invention relates to a fluid shock absorber.

2. Description of The Prior Art

Fluid shock absorbers have a wide range of uses. One such use is in damping relative movement of parts of a vehicle, such as an automobile. Typically, fluid shock absorbers are used to damp the oscillations of vehicle wheels relative to the vehicle frame. A shock absorber is generally used in conjunction with a spring, such as a coil spring or leaf spring, at each wheel.

Often, instead of a shock absorber/spring combination, a MacPherson strut is used. A MacPherson strut combines the functions of the shock absorber and the spring, and also serves as a structural link in the vehicle suspension. A MacPherson strut typically includes a hydraulic shock absorber, a coil spring surrounding the shock absorber, and means for attaching the strut o the vehicle frame and to the wheel. The shock absorber includes a cylinder, a piston movable in the cylinder and a piston rod attached to the piston and extending through an end of the cylinder.

In a MacPherson strut, the end of the shock absorber piston rod is the upper attachment point for the strut; that is, it is the part which attaches to the vehicle frame. Since the MacPherson strut serves as a structural link in the vehicle suspension, the strut is subjected to substantial radial forces, i.e., forces which act in a direction transverse to the longitudinal axis of the shock absorber. These forces are transmitted through the piston rod incorporated in the strut. Accordingly, a shock absorber which is used in a MacPherson strut must be designed to withstand substantial radial forces without impairing its operation.

A MacPherson strut is generally mounted in a near-vertical orientation, since most wheel travel is in the vertical direction. When a MacPherson strut is used in association with a front wheel in a vehicle, the maximum overall length of the MacPherson strut (strut extended) dictates the height of the upper strut mounting point and, thus, dictates the external hood height of the vehicle. Hood height reduction is desirable to improve vehicle aerodynamic efficiency. To reduce the hood height it is necessary, therefore, to reduce the maximum overall strut length.

The maximum overall strut length is determined generally by adding the cylinder stroke length, the piston rod free travel length, and the length of the piston rod/-cylinder overlap. The cylinder stroke length is equal to the distance the piston travels along the cylinder from the point of full compression at one end to the point of full extension at the other end of the cylinder. The piston rod free travel length is equal to the distance the piston rod extends outwardly of the end of the cylinder when fully extended. The piston rod/cylinder overlap is equal to the length of the piston rod which is still within the cylinder when the shock absorber is fully extended.

The function of the piston rod/cylinder overlap in a shock absorber is to provide structural rigidity against radial deflection of its parts including the piston rod when acted upon by forces transverse to the piston rod. However, this overlap increases the maximum overall strut length. Other factors which contribute to structural rigidity and affect the maximum overall strut length include the cylinder end bearing thickness (length) and the piston/cylinder wall bearing length (effectively the piston thickness). Reduction of these lengths and of the amount of piston rod/cylinder overlap would desirably contribute to reduction of the maximum overall strut length, without changing the length of the cylinder stroke.

SUMMARY OF THE INVENTION

The present invention relates to an apparatus for damping relative movement between two parts and which is of a minimum length and yet has sufficient structural rigidity to sustain radial loadings placed thereon without undergoing substantial radial deflection. The apparatus includes a piston-cylinder assembly which is used to damp relative movement between two parts. The present invention may be incorporated in a vehicle hydraulic shock absorber, or in a vehicle MacPherson strut which combines damping, spring, and structural functions. The present invention is illustrated herein as a hydraulic shock absorber for use in a vehicle and preferably for use in a MacPherson strut; however, the present invention is not limited to such uses or applications.

The present invention provides a reduced length hydraulic shock absorber which does not sacrifice structural rigidity under radial loads. The shock absorber includes a cylinder, a piston movable in the cylinder, and a piston rod attached to the piston and extending through an end of the cylinder. A sleeve having an end cap is attached to the cylinder adjacent the end of the cylinder from which the piston rod extends. The piston rod extends through an opening in the sleeve end cap. The sleeve telescopes on the end of the cylinder and is spring-biased axially outwardly of the cylinder. When the shock absorber is fully or mostly compressed, a collar on the piston rod bears against the sleeve to telescope the sleeve inwardly onto the cylinder.

The sleeve, when telescoped outward of the cylinder, provides radial load bearing support for the piston rod, at a point spaced outwardly from the cylinder end bearing, thus eliminating the need for any piston-cylinder overlap. The piston rod can thus be made shorter by the amount of overlap which has been eliminated. This substantially shortens the maximum overall length (strut extended) of the strut.

The cylinder end bearing and the piston-cylinder wall bearing may also be reduced in thickness because less radial force is transmitted by these bearings since the piston rod is shorter and provides a shorter moment arm, and also because there is a third bearing, the sleeve end bearing, which transmits some of the force which would otherwise be carried solely by these two bearings. Together, these length reductions allow a desired reduction in the maximum overall length of the piston-cylinder assembly, and thus a reduction in the overall length of a MacPherson strut which incorporates such a shock absorber.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic view in section of a prior art shock absorber in a fully extended condition;

FIG. 2 is a schematic view in section of a shock absorber according to the present invention, in a fully extended (non-jounce or rebound) condition;

DESCRIPTION OF A PRIOR ART APPARATUS

Figure 3:
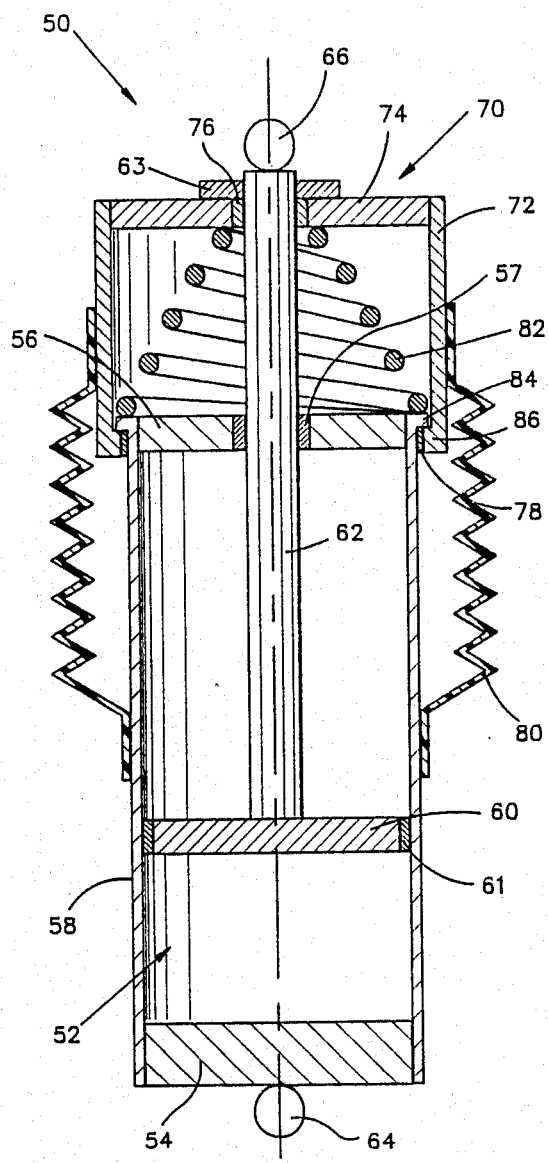
FIG. 3 is a schematic view in section of the device of FIG. 2 in a partly compressed (partial jounce) position.

For purposes of understanding the present invention, a typical prior art shock absorber 10 (FIG. 1) as used in a MacPherson strut will first be described. The shock absorber 10 includes a cylinder 12 having a lower cylinder end 14, an upper cylinder end 16, and a cylinder wall 18 extending therebetween. (The terms "upper" and "lower" are used solely for the sake of convenience in reference to the drawings herein, and are not meant to limit the invention in any way.) A piston 20 is disposed within cylinder 12. A piston rod 22 is attached to piston 20 and extends axially outwardly of cylinder 12 through an opening in the upper cylinder end 16.

The prior art shock absorber 10 is designed to damp relative movement between two parts. Cylinder 12 is attachable via cylinder mount 24 to one of the parts such as a vehicle wheel (not shown), and piston rod 22 is attachable via piston rod mount 26 to the other one of the parts, such as a vehicle frame (not shown). Cylinder 12 contains a damping fluid (not shown). There is at least one restricted orifice 27 extending through piston 20, through which the damping fluid may flow. As the two vehicle parts to which the piston 20 and cylinder 12 are attached move relative to each other, piston 20 and cylinder 12 will also be forced to move relative to each other. The damping fluid will flow through the restricted orifice 27, slowing movement of the piston 20 relative to the cylinder 12, and thus slowing or damping the relative movement of the two parts to which the shock absorber is connected. A stop member 28, secured within cylinder 12, limits axial outward movement of the piston 20 and piston rod 22 upon full extension of shock absorber 10. An elastomeric jounce bumper 30, secured to the vehicle part to which the piston rod 22 is attached, limits compression or jounce movement of the shock absorber 10 upon full compression thereof.

The prior art shock absorber 10 is subject not only to axial loading, but also to radial loads, i.e., loads that act transverse to the piston rod 22. Such a shock absorber must therefore possess sufficient structural rigidity to avoid any significant radial deflection of the parts including the piston rod which would detract from its functioning properly.

In the prior art shock absorber shown in FIG. 1, this structural rigidity is obtained by means of the thickness of the cylinder end bearing 32, the thickness of the piston/cylinder wall bearing 34, and the provision of a substantial amount of piston rod/cylinder overlap 36. Were this overlap not present, and were piston 20 allowed to travel fully to the upper end 16 of cylinder 12, the piston rod 22 would have very low resistance to radial deflection because of the relatively large moment of force acting upon the extended piston rod 22. Similarly, were either the cylinder end bearing thickness 32 or the piston/cylinder wall bearing thickness 34 reduced substantially, shock absorber 10 would again have less resistance to radial loads. Cylinder end bearing thickness 32 and piston cylinder wall bearing length 34 thus must be greater than is otherwise necessary. These factors all add to the overall maximum extended length of the shock absorber 10, and in particular the length of the piston rod 22, without providing any additional shock absorbing function.

DESCRIPTION OF A PREFERRED EMBODIMENT

Figure 4:
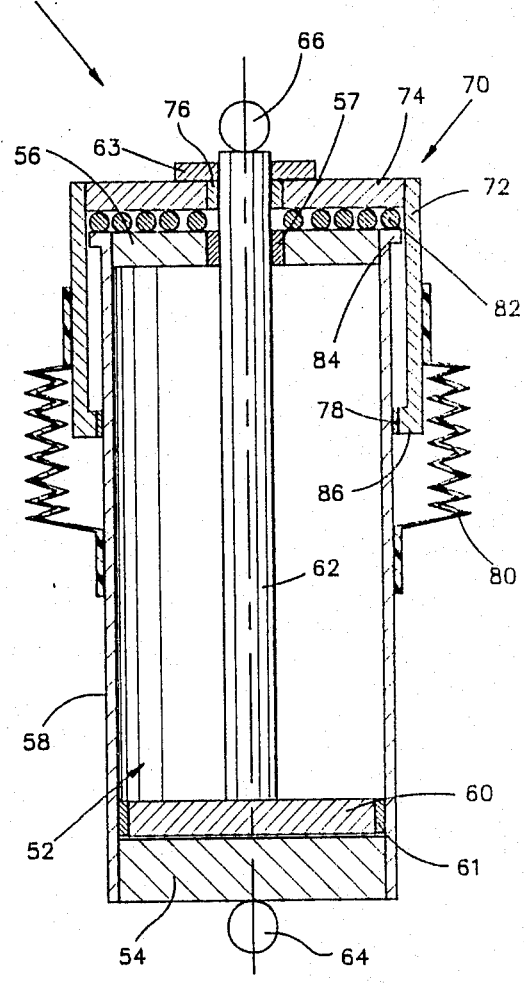
FIG. 4 is a schematic view in section of the device of FIG. 2 in a fully compressed (full jounce) position.

A shock absorber according to the present invention may be constructed without length which is solely for structural rigidity, while not sacrificing structural rigidity and without impairing the shock absorbing functions. FIGS. 2-4 illustrate a shock absorber according to the present invention, in various positions of compression and extension.

FIG. 2 illustrates a shock absorber 50 according to the present invention in a fully extended position. Shock absorber 50 is designed to have the same work stroke as the prior art shock absorber 10 (FIG. 1). The shock absorber 50 (FIG. 2) includes a cylinder 52 having a lower cylinder end 54, an upper cylinder end 56, and a cylinder wall 58 extending therebetween. (The terms "upper" and "lower" are used herein solely for convenience in reference to the drawings, and are not intended to limit in any way the invention disclosed herein.) A piston 60 is disposed within cylinder 52. A piston rod 62 is secured to piston 60 and extends axially outward of cylinder 52 through an opening in upper cylinder end 56. A collar member 63 is attached to piston rod 62 adjacent the upper end thereof.

Upper cylinder end 56 includes a cylinder end bearing 57 to provide for relative sliding movement between upper cylinder end 56 and piston rod 62, and to provide radial load bearing support for piston rod 62. Piston 60 includes a piston/cylinder wall bearing 61 to provide for relative sliding movement between piston 60 and cylinder wall 58, and to provide radial load bearing support for piston 60.

Shock absorber 50 is designed to damp relative movement between two parts, such as two vehicle parts, i.e., a vehicle wheel and a vehicle frame. Cylinder 52 is attachable to one of these parts by means of cylinder mount 64, and piston rod 62 is attachable to the other of the parts via piston rod mount 66. Cylinder 52 contains a damping fluid (not shown) by which shock absorber 50 operates in a known manner to damp relative movement between the two parts to which the shock absorber 50 is attached, substantially as described hereinabove with reference to the operation of the prior art shock absorber 10.

Shock absorber 50 (FIG. 2) includes a sleeve 70 telescopically mounted on cylinder 52 adjacent upper cylinder end 56. Sleeve 70 includes a circumferential sleeve wall 72 and a sleeve end 74. Sleeve end 74 includes a centrally located opening having a sleeve end bearing 76 through which piston rod 62 extends. Sleeve end bearing 76 provides for relative sliding movement between piston rod 62 and sleeve 70, and provides radial load bearing support for piston rod 62. A sleeve/cylinder wall bearing 78 provides for relative sliding movement between sleeve 70 and cylinder 52 and also provides radial load bearing support thereat.

A circumferential bellows 80 attached to sleeve 70 and to cylinder wall 58 provides a flexible seal between sleeve 70 and cylinder 52.

A coil spring 82 is disposed within sleeve 70 and acts between sleeve end 74 and upper cylinder end 56, to bias sleeve 70 axially outwardly of cylinder 52. In the position of shock absorber 50 illustrated in FIG. 2, sleeve 70 is telescoped outwardly of cylinder 52.

Cylinder wall 58 (FIG. 2) includes at its upper end a circumferential stop member 84. Sleeve 70 includes at its lower end a circumferential stop member 86. Axial outward movement of sleeve 70 is limited by coaction between stop member 84 on cylinder 52 and stop member 86 on sleeve 70 which, when they abut, will prevent further axial outward movement of sleeve 70.

Spring 82 may be a variable rate coil spring, having a lower spring rate when extended and a higher spring rate which takes effect when spring 82 is almost fully compressed. If so configured, spring 82 will act as a jounce bumper, replacing the elastomeric jounce bumper 30 (FIG. 1) of the prior art shock absorber assembly, because when shock absorber 50 (FIG. 4) is being fully compressed, collar member 63 abuts sleeve end 74 and telescopes sleeve 70 onto cylinder 52, compressing spring 82 and bringing the higher spring rate of spring 82 into effect upon full jounce or compression. Coil spring 82 may preferably be a conical coil spring as shown, in order to reduce its axial extent when compressed.

As noted above, FIG. 2 illustrates the shock absorber 50 according to the present invention, in the fully extended position. In this position, piston 60 is disposed at the upper end of cylinder 52 and is adjacent upper cylinder end 56. Sleeve 70, being biased by spring 82 axially outwardly of cylinder 52, is fully telescoped outwardly from cylinder 52. Stop member 86 on sleeve 70 is abutting stop member 84 on cylinder 52, thus preventing further axial outward movement of sleeve 70.

In the extended position of the shock absorber 50 shown in FIG. 2, the sleeve 70, through sleeve end bearing 76, provides radial load bearing support for the extended piston rod 62 at a point spaced apart from cylinder end bearing 57 by a distance approximately equal to the axial length of sleeve 70. Radial loads applied to piston rod 62, for example, are transmitted through sleeve end bearing 76, cylinder end bearing 57, and piston/cylinder wall bearing 61, which are spaced apart by a total distance approximately equal to the axial length of sleeve 70. This length is approximately the same as the amount of piston rod/cylinder overlap 36 in the prior art shock absorber 10 (FIG. 1).

Because of the radial load bearing support provided by sleeve end bearing 76, the shock absorber 50 (FIG. 2) according to the present invention does not need any piston rod/cylinder overlap. Since the work stroke of the shock absorber 50 (FIG. 2) is the same as the work stroke of the prior art shock absorber 10 (FIG. 1), elimination of the piston rod/cylinder overlap means that both the cylinder 52 (FIG. 2) and the piston rod 62 can be made shorter by the length of the (eliminated) piston rod/cylinder overlap. Thus, for a shock absorber or strut having the same work stroke, the maximum overall length of the shock absorber or strut (strut extended) is significantly less, as can be seen from a comparison of FIG. 1 and FIG. 2. Nonetheless, the radial load bearing capacity of the shock absorber 50 of the present invention is at least as great as that of a prior art shock absorber 10 shown in FIG. 1.

FIG. 3 illustrates the shock absorber 50 according to the present invention in a partially compressed condition. Piston 60 has moved partially downward into cylinder 52 from the condition shown in FIG. 2, to the point where collar member 63 on piston rod 62 engages sleeve end 74. At this point, sleeve 70 is still telescoped fully axially outwardly of cylinder 52 because of the biasing force applied by spring 82, and sleeve 70 continues to provide radial load bearing support for piston rod 62.

FIG. 4 illustrates the shock absorber 50 according to the present invention in a fully compressed (jounce) condition. Relative movement between the two vehicle parts to which the shock absorber 50 is connected moves the piston 60 fully downward into the cylinder 52 adjacent the lower cylinder end 54. As piston 60 and piston rod 62 move inwardly with respect to cylinder 52, collar member 63 on piston rod 62 forces sleeve 70 to telescope axially inwardly against the biasing force of spring 82. Sleeve 70 is thus disposed surrounding the upper portion of cylinder 52.

When shock absorber 50 is in the fully compressed condition shown in FIG. 4, radial deflection loads are spread between sleeve end bearing 76, cylinder end bearing 57, sleeve/cylinder bearing 78, and piston/cylinder wall bearing 61. At full jounce as thus shown, the various bearings, which provide radial load bearing support, are spaced apart over the distance of the full cylinder stroke, as in the prior art shock absorber 10 (FIG. 1).

Because piston rod 62 (FIG. 2) of the shock absorber 50 of the present invention is substantially shorter than piston rod 22 (FIG. 1) of the prior art shock absorber 10, piston rod 62 (FIG. 2) provides a shorter moment arm for transmitting radial forces applied to it. The resultant forces it transmits will therefore be smaller. Since such forces are transmitted into the cylinder 52 of shock absorber 50 at least partially by cylinder end bearing 57 and piston/cylinder wall bearing 61, the thickness or length of these two bearings may be reduced. Their lengths may also be reduced because sleeve end bearing 76 transmits some of the radial force. This further contributes to a desired shortening of the maximum overall length of the shock absorber 50.

In summary, it can be seen that when the piston rod 62 is extended outwardly from the cylinder 52 and sleeve 70 is telescoped outwardly from cylinder 52, radial forces acting upon the shock absorber 50 have the most effect because of the large moment of force resulting from the long moment arm of the extended piston rod 62. Thus, sleeve 70 provides radial load bearing support when it is most needed. The cylinder/piston overlap necessary in the prior art shock absorber 10 (FIG. 1) may be eliminated and piston rod 62 may be made shorter by that length. The thickness of cylinder end bearing 57 and of piston/cylinder wall bearing 61 may also be reduced, because less radial force is being transmitted by these bearings. It is anticipated that a typical prior art shock absorber having a maximum overall length (strut extended) of approximately 22 inches may be reduced in length by approximately 2½ inches to 4 inches, when constructed in accordance with the present invention.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, I claim:

1. An apparatus for damping relative movement of two parts, comprising:
   a cylinder defining a fluid chamber containing damping fluid;
   a piston located in said fluid chamber;
   a piston rod secured to said piston comprising a piston rod end connected to one of the parts;
   said cylinder being for connection to the other of the parts, said piston and said cylinder moving relatively in compression and extension strokes to damp relative movement of the two parts;
   said cylinder comprising a first cylinder end, means for defining an opening in said cylinder end, and radial load bearing support means positioned within said cylinder opening;
   said piston rod extending through and being slidable in said cylinder opening;
   a sleeve telescopically attached to said cylinder adjacent said first cylinder end and movable axially relative to said first cylinder end;
   said sleeve comprising a sleeve end, means defining an opening in said sleeve end aligned axially with said cylinder opening, and radial load bearing support means positioned within said sleeve opening, said piston rod extending through and being slidable in said sleeve opening;
   stop means on the cylinder and sleeve to prevent disengagement of said cylinder and sleeve; and
   biasing means biasing the sleeve stop means against the cylinder stop means;
   said stop means and biasing means positioning said sleeve end at a position intermediate and spaced from said first cylinder end and said piston rod end.

2. An apparatus as defined in claim 1 wherein said radial load bearing support for said piston rod comprises bearing means for slidably receiving said piston rod in the opening in said sleeve end.

3. An apparatus as defined in claim 1 further comprising bearing means for providing radial load bearing support between said sleeve and said cylinder.

4. An apparatus as defined in claim 1 further comprising spring means for biasing said sleeve axially outwardly of said cylinder.

5. An apparatus as defined in claim 4 wherein said spring means comprises a coil spring disposed within said sleeve and acting between said sleeve end and said first cylinder end to bias said sleeve axially outwardly of said cylinder.

6. An apparatus as defined in claim 5 wherein said coil spring is a variable rate coil spring having a first lower spring rate effective over a first range of compression of said coil spring, and a second higher spring rate effective upon compression of said coil spring in a second range of compression.

7. An apparatus as defined in claim 4 further comprising collar means on said piston rod for engaging said sleeve end to move said sleeve axially inwardly upon said cylinder against the biasing force of said spring means upon sufficient compression movement of said piston relative to said cylinder.

8. An apparatus as defined in claim 5 further including radial load bearing support means on said piston for transmitting radial loads between said piston and said cylinder, and bearing means for providing radial load bearing support for said sleeve on said cylinder.

9. An apparatus as defined in claim 1 wherein said piston engages said first cylinder end upon a full extension movement of said piston relative to said cylinder.

10. An apparatus for damping relative movement of two parts, said apparatus comprising:
    a cylinder defining a fluid chamber containing damping fluid, a piston located in said fluid chamber, a piston rod secured to said piston comprising a piston rod end connected to one of the parts and said cylinder being connected to the other of the parts, said piston and said cylinder moving relatively in compression and extension strokes to damp relative movement of the two parts;
    said cylinder comprising a first cylinder end, means defining an opening in said cylinder end, and radial load bearing support means positioned within said cylinder opening;
    said piston rod extending through and being slidable in said cylinder opening;
    a sleeve telescopically attached to said cylinder adjacent said first cylinder end and movable axially outwardly therefrom to increase the effective radial load bearing support for said piston rod when said piston rod is moved axially outwardly from said first cylinder end;
    said sleeve comprising a sleeve end, means defining an opening in said sleeve end aligned axially with said cylinder opening, said piston rod extending through and being slidable in said sleeve opening, and bearing means within said sleeve opening for providing radial load bearing supports for said piston rod, and further including bearing means for providing radial load bearing support for said sleeve on said cylinder;
    stop means on the cylinder and sleeve to prevent disengagement of said cylinder and sleeve;
    a coil spring disposed within said sleeve and acting between said sleeve end and said first cylinder end to bias said sleeve axially outwardly of said cylinder;
    said stop means and coil spring positioning said sleeve end at a position intermediate and spaced from said first cylinder end and said piston rod end;
    collar means on said piston rod for moving said sleeve axially inwardly upon said cylinder against the biasing force of said spring; and
    radial load bearing support means on said piston for transmitting radial loads between said piston and said cylinder.

11. An apparatus as defined in claim 10 wherein said coil spring is a variable rate conical coil spring having a first lower spring rate effective over a first range of compression of said coil spring and a second higher spring rate becoming effective upon compression of said coil spring beyond said first range.

12. A hydraulic shock absorber comprising:
    a cylinder comprising a cylinder end and means defining an opening in said cylinder end;
    a piston in said cylinder;
    a piston rod secured to said piston and extending in sliding relationship through said cylinder opening, said piston rod comprising a piston rod end;
    means for providing radial load bearing support for said piston rod axially outwardly of said cylinder comprising a circumferential sleeve member telescopically attached to said cylinder adjacent said end of said cylinder and extending axially outwardly of said cylinder, said sleeve member comprising a sleeve end, means defining an opening in said sleeve end axially aligned with said cylinder opening, said piston rod extending in sliding relationship through said sleeve opening;

means biasing the sleeve end axially outwardly from said cylinder end;

stop means on the cylinder and sleeve to prevent disengagement of said cylinder and sleeve;

said stop means and biasing means positioning said sleeve end intermediate and spaced from said cylinder end and said piston rod end.

13. An apparatus for damping relative movement of two parts, said apparatus comprising;

a cylinder defining a fluid chamber containing a hydraulic damping fluid, a piston located in said fluid chamber;

said cylinder comprising a first cylinder end, means defining an opening in said cylinder end, and radial load bearing support means positioned within said cylinder opening;

a piston rod secured to said piston and extending through said opening in said first cylinder end, said piston rod being connected to one of said parts and said cylinder being connected to the other of said parts, said piston and said cylinder moving relatively in compression and extension strokes to damp relative movement of the two parts;

a sleeve telescopically attached to said cylinder adjacent said first cylinder end and movable axially outwardly therefrom to increase the effective radial load bearing support for said piston rod when said piston rod is moved axially outwardly from said first cylinder end;

said sleeve comprising a sleeve end, means defining an opening in said sleeve end adjacent axially with said cylinder opening, and bearing means within said sleeve opening for providing radial load bearing support, said piston rod extending through and being slidable in said sleeve opening;

a coil spring disposed within said sleeve and acting between said sleeve end and said first cylinder end to bias said sleeve axially outwardly of said cylinder;

stop means on the cylinder and sleeve to prevent disengagement of said cylinder and sleeve;

collar means on said piston rod for moving said sleeve axially inwardly upon said cylinder against the biasing force of said spring;

radial load bearing support means on said piston for transmitting radial load between said piston and said cylinder;

further bearing means for providing radial load bearing support for said sleeve on said cylinder;

circumferential bellows means between said cylinder and said sleeve providing a flexible seal for said further bearing means;

said coil spring being collapsible positioning the sleeve end contiguous with the cylinder end;

said piston being movable from a fully extended position in which the piston is contiguous with the cylinder end to a fully compressed position in which the sleeve end is contiguous with the cylinder end;

said stop means and coil spring positioning said sleeve at a position intermediate and spaced from said collar means and said cylinder end.

* * * * *

UNITED STATES PATENT AND TRADEMARK OFFICE
CERTIFICATE OF CORRECTION

PATENT NO. : 4,828,237
DATED : May 9, 1989
INVENTOR(S) : Charles E. Neff

It is certified that error appears in the above-identified patent and that said Letters Patent is hereby corrected as shown below:

Column 8, Line 28, change "supports" to "support"

Column 9, Line 33, change "adjacent" to "aligned"

Signed and Sealed this

Twentieth Day of March, 1990

Attest:

JEFFREY M. SAMUELS

Attesting Officer

Acting Commissioner of Patents and Trademarks